United States Patent
Lee et al.

(10) Patent No.: US 9,063,901 B2
(45) Date of Patent: Jun. 23, 2015

(54) METHOD AND SYSTEM FOR PREVENTING LOSS OF TRIP DATA IN VEHICLE

(71) Applicants: Hyundai Motor Company, Seoul (KR); Kia Motors Corporation, Seoul (KR); Continental Automotive Electronics LLC, Chungcheongbuk-do (KR)

(72) Inventors: Kang Ho Lee, Incheon (KR); Won Taek Oh, Daejeon (KR); Kyoung Ha Kim, Daejeon (KR)

(73) Assignees: Hyundai Motor Company, Seoul (KR); Kia Motors Corporation, Seoul (KR); Continental Automotive Electronics LLC, Chungcheongbuk-do (KR)

( * ) Notice: Subject to any disclaimer, the term of this patent is extended or adjusted under 35 U.S.C. 154(b) by 279 days.

(21) Appl. No.: 13/715,966

(22) Filed: Dec. 14, 2012

(65) Prior Publication Data

US 2014/0053030 A1     Feb. 20, 2014

(30) Foreign Application Priority Data

Aug. 16, 2012    (KR) .................. 10-2012-0089745

(51) Int. Cl.
| | |
|---|---|
| G06F 11/00 | (2006.01) |
| G06F 12/16 | (2006.01) |
| G06F 11/08 | (2006.01) |
| G06F 11/10 | (2006.01) |
| G06F 11/14 | (2006.01) |

(52) U.S. Cl.
CPC .............. G06F 12/16 (2013.01); G06F 11/08 (2013.01); G06F 11/1004 (2013.01); G06F 11/1441 (2013.01)

(58) Field of Classification Search
CPC ... G06Q 10/0833; G06Q 40/08; G07C 5/008; B61L 27/04; B61L 3/125; B61L 3/221; G01C 22/02
USPC .................................................... 714/15, 49
See application file for complete search history.

(56) References Cited

U.S. PATENT DOCUMENTS

| | | | | |
|---|---|---|---|---|
| 5,948,026 | A  * | 9/1999  | Beemer et al. ............... | 701/33.4 |
| 5,964,813 | A  * | 10/1999 | Ishii et al. .................... | 701/29.2 |
| 6,169,944 | B1 * | 1/2001  | Hayasaka ...................... | 701/36 |
| 6,601,176 | B1 * | 7/2003  | Alexander et al. ........... | 713/300 |
| 7,886,099 | B2 * | 2/2011  | Bono ............................ | 710/260 |
| 8,082,077 | B2 * | 12/2011 | Nishida et al. ................ | 701/36 |
| 2009/0106490 | A1 * | 4/2009 | Nakasato ...................... | 711/113 |

(Continued)

FOREIGN PATENT DOCUMENTS

| | | |
|---|---|---|
| JP | 2000-112836 A | 4/2000 |
| JP | 2003-345672 A | 12/2003 |
| JP | 2006-328965 A | 12/2006 |

*Primary Examiner* — Bryce Bonzo
*Assistant Examiner* — Elmira Mehrmanesh
(74) *Attorney, Agent, or Firm* — Mintz Levin Cohn Ferris Glovsky and Popeo, P.C.; Peter F. Corless

(57) ABSTRACT

Disclosed herein is a method for preventing a loss of trip data of a vehicle during a substantial instantaneous voltage drop in a vehicle cluster. In the method, the trip data calculated by a processor of a trip computer are stored in a clear region of a memory and the trip data stored in the clear region are backed up in a nonvolatile region of the memory when new trip data is generated. The processor collects the trip data backed up in the nonvolatile region to rewrite the trip data in the clear region after a substantially instantaneous voltage drop occurs.

14 Claims, 3 Drawing Sheets

(56) References Cited

U.S. PATENT DOCUMENTS

2009/0158085 A1\* 6/2009 Kern et al. ........................ 714/6
2010/0250060 A1\* 9/2010 Maeda et al. ................... 701/35

\* cited by examiner

METHOD AND SYSTEM FOR PREVENTING LOSS OF TRIP DATA IN VEHICLE

CROSS-REFERENCE

This application claims priority from under 35 U.S.C. §119 (a) to Korean Patent Application No. 10-2012-0089745 filed Aug. 16, 2012, the entire contents of which are incorporated herein by reference.

BACKGROUND OF THE INVENTION (a) Field of the Invention

The present invention relates to a method for preventing a loss of trip data in a vehicle cluster. More particularly, the present invention relates to a method that may prevent trip data of a cluster from being lost or initialized without an additional voltage stabilizer or an electrically erasable programmable read-only memory (EEPROM) for storage when an instantaneous low voltage state occurs in the cluster due to start-up of a vehicle or a large electric load.

(b) Description of the Related Art

Recently, most vehicles are equipped with a cluster mounted with a trip computer, which provides a driver with information on average fuel efficiency, instantaneous fuel efficiency, traveled distance, average speed, driving time, and distance to empty (DTE) via a display.

The trip computer may indicate: the average fuel efficiency by calculating fuel consumption over a certain traveled distance, the current fuel efficiency by calculating the fuel consumption over the traveled distance for a certain time, the total traveled distance by adding the traveled distances of a vehicle, the average speed from the start driving point to the current driving point, and the DTE by calculating a drivable distance using the amount of remaining fuel and the fuel efficiency set for the corresponding vehicle.

In particular, as shown in FIG. 1, the trip computer may include a processor (Micom) 20 for calculating data such as average fuel efficiency and traveled distance which may be presented on displays using various kinds of intra-vehicle signals, for example, all signals inputted from a signal input unit 11 such as engine control unit (ECU), transmission control unit (TCU), automatic brake system (ABS), and a vehicle speed sensor. When a driver manipulates a reset button 13, the Micom 20 may delete data stored in a memory and may reset the display information such as the average fuel efficiency and the traveled distance.

Also, the trip computer further includes a memory 30 for storing data calculated by the Micom 20, a display 40 for displaying various kinds of information including the average fuel efficiency and the traveled distance calculated by the Micom 20, a mode switching button 12 for switching the display modes of the trip computer by a driver, and a reset button 13 for resetting the data value of each display mode to zero by a driver.

The memory 30 may include a Random Access Memory (RAM) 31 in which data processed by the Micom 20 may be stored. When the power supply to the RAM 31 is cut off, all data stored in the RAM 31 may be lost. Furthermore, when a user manipulates the reset button 13, all data stored by the Micom 20 may be deleted and reset in communication therewith.

The memory 30 of the trip computer further includes an EEPROM 32 for permanently storing data. Data stored in the EEPROM 32 may be maintained regardless of power supply to the trip computer and the cluster. The cluster includes a set of instrumentations displayed on the trip computer, such as the fuel efficiency, traveled distance, average speed, driving time and distance to empty.

On the other hand, when a voltage lower than 5V instantaneously occurs due to a battery voltage drop (occurrence of battery reset after start-up) under a start-up condition of a vehicle or a large electric load condition, the cluster is reset. In this case, unlike a periodic normal operation loop of the trip computer, all data stored in the RAM 31 of the trip computer may be deleted (cleared), and simultaneously, all display data may be reset.

The stored data is not deleted when a driver normally performs the reset manipulation, i.e., when the driver intentionally manipulates the reset button 13. Instead, the data may be deleted when data of the trip computer are unexpectedly lost and forcibly reset. Accordingly, a user may misperceive the reset of data as an abnormal operation.

With the recent development of technology, the start-up condition of the vehicle may be possible at a battery voltage lower than 5 V, which is a level of voltage lower than the minimum operation condition for reliability functions such as intra-vehicle communication or the normal operation power voltage for electric components.

On the other hand, in a conventional trip computer, the Micom 20 needs a voltage of 5 V or more supplied via the regulator for stable operation. However, when the trip computer is maintained at a voltage less than 5 V for a certain time, the Micom 20 may be reset, and all data stored in the RAM 31 may be deleted and reset (for example, forcible switching to trip computer mode, average fuel efficiency displayed as '_._', traveled distance displayed as '0 km', average speed displayed as '0 km/h', and driving time displayed as '00:00').

To prevent the unexpected reset of the trip data (data of the trip computer in a cluster), i.e., the occurrence of the reset of the trip data due to the voltage drop, a separate voltage stabilizer (application of a dual regulator circuit) may be added, or a method of continuously storing all trip data generated in real-time by the Micom 20 in the EEPROM 32, a nonvolatile memory, may be applied. However, these alternatives may cause an increase in the manufacturing cost due to the addition of the circuit or the use of a large capacity of EEPROM.

The above information is only for enhancement of understanding of the background of the invention and therefore it may contain information that does not form the prior art that is already known in this country to a person of ordinary skill in the art.

SUMMARY OF THE INVENTION

The present invention provides a method that may prevent trip data (data of a trip computer to be displayed on a display) of a cluster from being lost or reset without an additional voltage stabilizer or an EEPROM for storage when an instantaneous low voltage state occurs in the cluster due to start-up of a vehicle or a large electric load.

In one embodiment, the present invention provides a method for preventing a loss of trip data of a vehicle upon an instantaneous voltage drop in a vehicle cluster, wherein a Random Access Memory (RAM) may be partitioned into several portions. The method comprising: storing, by a processor (Micom), the trip data calculated by the processor (Micom) of a trip computer in a clear region of the partitioned RAM and backing up the trip data (old trip data) stored in the clear region into a nonvolatile region of the partitioned RAM when new trip data is generated; and collecting, by the Micom, the trip data backed up in the nonvolatile region to rewrite the old trip data in the clear region after an instantaneous voltage drop occurs.

In an exemplary embodiment, in collecting the old trip data, the Micom may display the trip data rewritten in the clear region on a display.

In another exemplary embodiment, the nonvolatile region may be provided in the RAM to temporarily store data upon occurrence of the voltage drop.

In still another exemplary embodiment, in storing of the trip data by Micom, the Micom may calculate a checksum from the calculated trip data to store the checksum in the clear region, and then back up the old trip data stored in the clear region and the old checksum calculated therefrom into the nonvolatile region when a new checksum calculated from new trip data that are generated is different from the old checksum stored in the clear region.

In yet another exemplary embodiment, in collecting of the old trip data, the Micom; may recalculate a checksum from the old trip data backed up in the nonvolatile region in storing of the trip data; and may compare the recalculated checksum with the old checksum stored in the nonvolatile region in storing of the trip data and then collect the old trip data backed up in the nonvolatile region to rewrite the old trip data in the clear region when the recalculated checksum is identical to the old checksum.

Other aspects and exemplary embodiments of the invention are discussed infra.

BRIEF DESCRIPTION OF THE DRAWINGS

The above and other features, objects and advantages of the present invention will now be more clearly understood from the following detailed description taken in conjunction with the accompanying drawings which are given hereinbelow by way of illustration only, and thus are not limitative of the present invention, and wherein.

Figure 1:
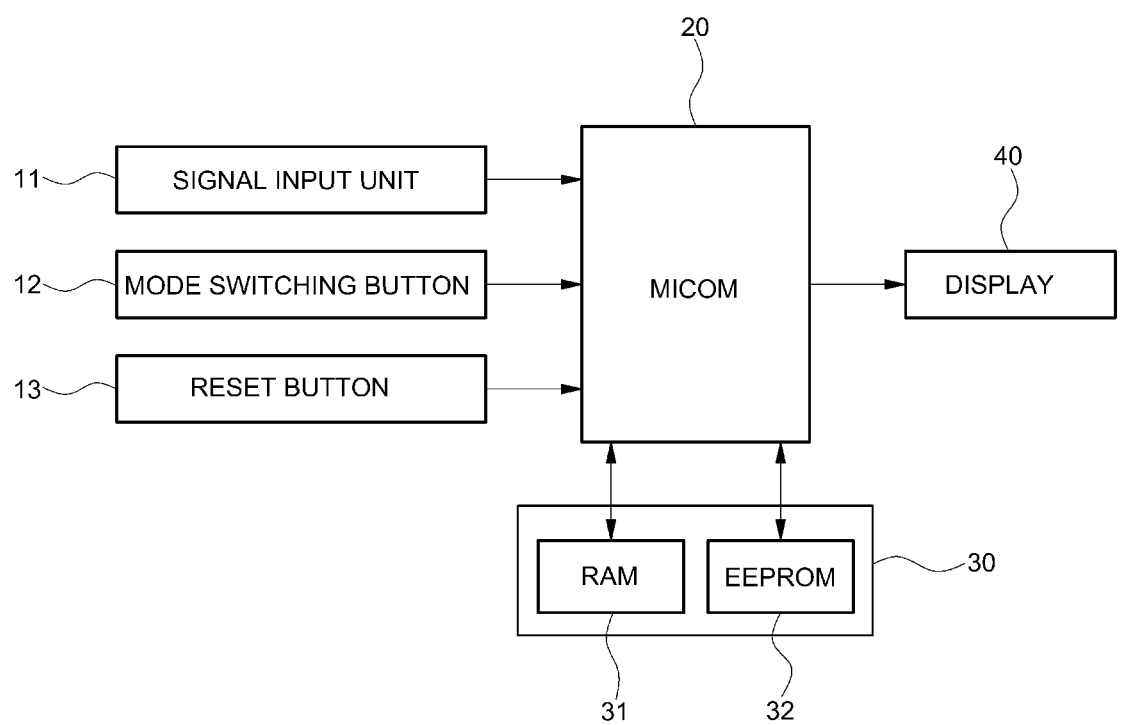
FIG. 1 is an exemplary block diagram illustrating a configuration of a conventional trip computer.

Reference numerals set forth in the Drawings include reference to the following elements as further discussed below:

| 11: signal input unit | 12: mode switching button |
|---|---|
| 13: reset button | 20: Micom |
| 30: memory | 31: RAM |
| 31a: nonvolatile region | 31b: clear region |
| 40: display | |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments of the present invention will be described in detail with reference to the accompanying drawings so that those skilled in the art can easily carry out the present invention.

The present invention provides a method for preventing trip data (data of a trip computer displayed on a display) of a cluster from being lost or initialized when an instantaneous low voltage state occurs in a cluster due to a battery voltage drop (occurrence of battery reset) caused by start-up of a vehicle or a large electric load.

Figure 2:
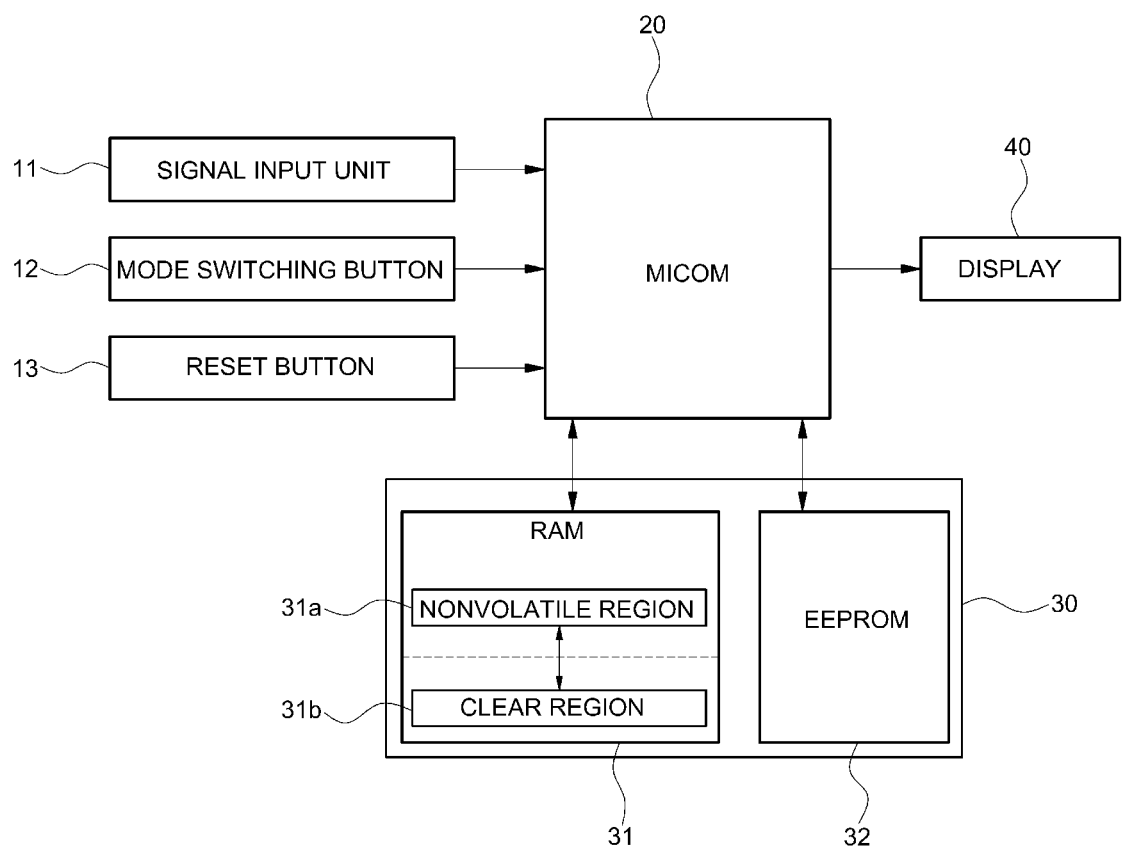
FIG. 2 is an exemplary block diagram illustrating a configuration of a trip computer according to an exemplary embodiment of the present invention.
Figure 3:
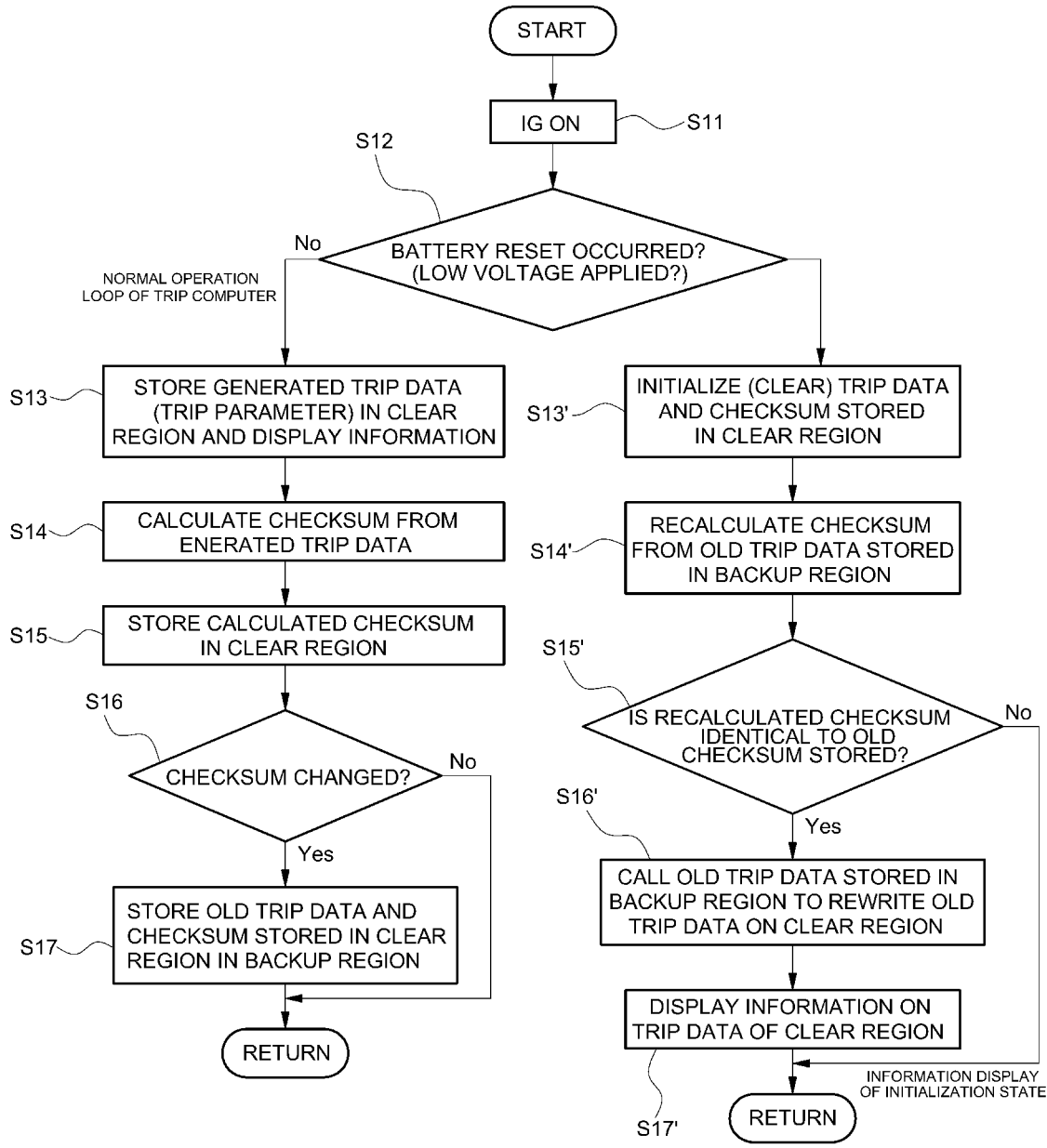
FIG. 3 is an exemplary flowchart illustrating a method for preventing a loss of trip data according to an exemplary embodiment of the present invention.

FIG. 2 is an exemplary block diagram illustrating a configuration of a trip computer according to an exemplary embodiment of the present invention. FIG. 3 is an exemplary flowchart illustrating a method for preventing a loss of trip data according to an exemplary embodiment of the present invention.

The configuration of a trip computer shown in the FIG. 2 contains components (except a RAM 31) similar to those of a conventional configuration as shown in FIG. 1, thus a detail description thereof will be omitted herein.

As shown in FIG. 2, a RAM 31 constituting a memory 30 may include a nonvolatile region 31a that may not be reset by a voltage change for a certain duration (e.g., shorter than about 10 seconds) and a volatile clear region 31b that may be reset by an instantaneous voltage change. In other words, the RAM 31 may include the clear region 31b in which trip data generated in a Micom 20 may be stored in real-time, and the nonvolatile region 31a in which old trip data prior to new trip data may be backed up.

The nonvolatile region 31a of the RAM 31 may provide a certain duration (e.g., 10 seconds) of data memory time to prevent a loss of important data (that is, provided to temporarily store data) under Micom error conditions (e.g., voltage drop, battery reset, etc.). When the Micom error conditions are maintained over a certain time, data stored in the nonvolatile region 31a may be lost.

In the configuration of the trip computer illustrated in FIG. 2, the Micom 20 may calculate trip data, such as average fuel efficiency, actual fuel efficiency, traveled distance, average speed, driving time, and distance to empty. In other words, the Micom 20 may calculate trip data to be displayed on a display 40 such as average fuel efficiency and traveled distance using all signals inputted from a signal input unit 11, the signal input unit comprising an engine controller, a transmission controller, an automatic brake system controller, and a vehicle speed sensor, which produce various kinds of signals in a vehicle. The trip data generated in the Micom 20 may be primarily recorded in the clear region 31b of the RAM 31.

The Micom 20 may display the trip data recorded in the clear region 31b on the display 40 to provide a driver with the trip information.

The method for preventing the loss of the trip data may include storing, by the processor (Micom), the trip data calculated by the Micom 20 during normal operation of the trip computer in the clear region of the RAM 31 and backing up the old trip data stored in the clear region 31b into the nonvolatile region 31a when new trip data is generated, and rewriting the old trip data backed up in the nonvolatile region 31a in the clear region 31b when a battery reset (voltage drop) occurs, and then displaying the trip data rewritten in the clear region 31b on the display 40.

Hereinafter, the method for preventing the loss of the trip data according to an exemplary embodiment of the present invention will be described in more detail with reference to FIG. 3.

In the initial step S11, an ignition may be turn on and power may be applied to a vehicle. When a voltage drop (e.g., a battery reset) does not occur in the cluster and the trip computer, the trip computer may operate normally (S13 to S17). However, when an instantaneous voltage drop (e.g., a battery reset) occurs and the voltage drop is released, the Micom 20 may collect trip data backed up in the nonvolatile region 31a and rewrite the trip data in the clear region 31b to display the trip data on the display 40 (S13' to S17').

First, when the battery reset does not occur, the Micom 20 of the trip computer may calculate trip data (trip parameter) to be displayed on the display 40 using various kinds of intra-vehicle signals, and may store the calculated trip data in the clear region 31b of the RAM 31 and may simultaneously display the calculated trip data on the display 40 (S13).

Additionally, the Micom 20 may calculate a checksum from the calculated trip data (S14). A method of calculating the checksum from the trip data may be one of well-known in the art. Since there are many well-known methods for reading data stored in the memory to calculate the checksum, a detailed description thereof will be omitted herein.

When the checksum is calculated by the Micom, the checksum may be stored, by the Micom, in the clear region 31b of the RAM 31 (S150). Thereafter, when new trip data is generated and a new checksum calculated therefrom is different from the old check sum stored in the clear region 31b, that is, when there is a change in checksum, the Micom 20 may determine that new trip data is generated, and may store the old trip data stored in the clear region 31b and the old checksum calculated therefrom in a backup region of the nonvolatile region 31a of the RAM 31 (S16 and S17).

When a battery reset occurs while the process of backing up new trip data into the nonvolatile region 31a after the calculated trip data and the checksum are stored in the clear region 31b is being performed during the normal operation of the trip computer, the processes of S13' to S17' of FIG. 3 may be performed.

The trip data and the checksum stored in the clear region 31b may be reset (e.g., deleted, cleared) by the battery reset (S13'). Thereafter, while the instantaneous voltage drop is released, the Micom 20 may recalculate the checksum from the old trip data backed up in the backup region of the nonvolatile region 31a of the RAM 31 (S14').

Subsequently, the Micom may compare the recalculated checksum with the old checksum stored in the backup region of the nonvolatile region 31a. When the recalculated checksum is identical to the old checksum, the Micom 20 may determine that the old trip data backed up in the nonvolatile region 31a are normal data that are not lost, and may collect the old trip data from the nonvolatile region 31a to rewrite the old trip data in the clear region 31b (here, the instantaneous voltage drop is in release state) (S16'). Furthermore, the Micom 20 may allow the trip data rewritten in the clear region 31b to be displayed on the display 40 as trip information through a conventional process (S17').

In this exemplary embodiment, the Micom may compare the recalculated checksum with the old checksum to determine whether they may be substantially identical. When the checksums are substantially identical, the Micom may be determine that the data values of the nonvolatile region 31a are normal, and the trip data of the nonvolatile region 31a may be collected and rewritten into the clear region 31b to be displayed on the display 40.

However, in the above process, when the Micom determines that the recalculated checksum is different from the old checksum backed up, the Micom may determine that the trip data backed up in the nonvolatile region 31a of the RAM 31 are damaged due to the lapse of a certain time (when the data of the nonvolatile region is damaged, the checksum may change). Accordingly, the trip information may be reset and displayed on the display 40 by the Micom.

In this exemplary embodiment, although the battery reset occurs, the trip data calculated by the Micom 20 may be normally displayed on the display 40. Particularly, regarding a voltage change within a duration of time (e.g., about 10 seconds) during which the trip data of the nonvolatile region 31a may be damaged, since the Micom 20 may collect the trip data of the nonvolatile region 31a into the clear region 31b to display the trip data on the display 40. Accordingly, although the instantaneous voltage drop occurs, the reset of the display information of the display 40 may be prevented.

When the instantaneous voltage drop occurs and the voltage drop is released, the Micom 20 may perform the battery reset illustrated in FIG. 3. In this case, since data backed up in the nonvolatile region 31a may be lost after the lapse of a certain time (about 10 seconds), the Micom may determine whether the recalculated checksum after the release of the voltage drop is substantially identical to the checksum with the old checksum backed up, check the normal trip data of the nonvolatile region 31a that are not lost at the instantaneous voltage drop, and then may collect the trip data into the clear region 31b to be displayed on the display 40. Thus, a user may not recognize the reset state due to the voltage drop.

When a voltage drop continues over a certain time (about 10 seconds), it may be considered as removal of the battery or a complete discharging. Accordingly, it may be unnecessary to store the trip data in the nonvolatile region 31a over a certain time. Thus, in this exemplary embodiment of the present invention, the loss and the reset of the trip data may be prevented regarding the instantaneous voltage drop for a substantially short period of time.

According to a method for preventing a loss of trip data in a vehicle, a RAM region may be divided into a volatile clear region and a nonvolatile region, trip data may be stored in a nonvolatile region to be displayed upon an unexpected voltage drop, and the reset of the trip data due to an instantaneous voltage drop may be prevented while a user performs an information reset (e.g., manipulation of the reset button or removal of the battery). Moreover, the reset of the trip data due to the instantaneous voltage drop may be prevented without an addition of a voltage stabilizer or an EEPROM for storage.

According to a method for preventing a loss of trip data in a vehicle, since a RAM region may be divided into a volatile clear region and a nonvolatile region, and trip data may be stored in a nonvolatile region to be displayed upon unexpected voltage drop, the loss and the reset of the trip data due to an instantaneous voltage drop may be prevented without an addition of a voltage stabilizer or an EEPROM for storage.

The invention has been described in detail with reference to exemplary embodiments thereof. However, it will be appreciated by those skilled in the art that changes and modifications may be made in these embodiments without departing from the principles and spirit of the invention, the scope of which is defined in the accompanying claims and their equivalents.

What is claimed is:

1. A method for preventing a loss of trip data of a vehicle upon a substantially instantaneous voltage drop in a vehicle cluster, the method comprising:
   calculating, by a processor of a trip computer, trip data from a plurality of signals;
   storing, by the processor, the calculated trip data in a clear region of a memory and backing up the trip data stored in the clear region into a nonvolatile region of the memory when new trip data is generated; and
   collecting, by the processor, the trip data backed up in the nonvolatile region to rewrite the trip data in the clear region after a substantially instantaneous voltage drop occurs,
   wherein the storing of the trip data further includes:
      calculating, by the processor, a checksum from the trip data,
      storing, by the processor, the checksum in the clear region, and
      backing up, by the processor, the trip data stored in the clear region and the checksum calculated therefrom into the nonvolatile region when a new checksum calculated from the generated new trip data is substantially different from the checksum stored in the clear region.

2. The method of claim 1, wherein, in the collecting of the trip data, the processor displays the trip data rewritten in the clear region on a display.

3. The method of claim 1, wherein the nonvolatile region is disposed in a portion of the memory and is configured to temporarily store, by the processor, data during the voltage drop.

4. The method of claim 1, wherein the collecting of the trip data further comprises:
   recalculating, by the processor, a checksum from the trip data backed up in the nonvolatile region in the storing of the trip data; and
   comparing, by the processor, the recalculated checksum with the checksum stored in the nonvolatile region in the storing of the trip data and collecting the trip data backed up in the nonvolatile region to rewrite the trip data in the clear region when the recalculated checksum is substantially identical to the checksum.

5. The method of claim 1, wherein the plurality of signals may be selected from a group consisting of: an engine controller signal, a transmission controller signal, an automatic brake system signal, and a vehicle speed sensor signal.

6. A non-transitory computer readable medium containing program instructions executed by a processor, the computer readable medium comprising:
   program instructions that calculate trip data of a vehicle using a plurality of controller signals and a vehicle speed sensor signal;
   program instructions that store the trip data in a clear region of a memory and backing up the trip data stored in the clear region into a nonvolatile region of the memory when new trip data is generated; and
   program instructions that collect the trip data backed up in the nonvolatile region to rewrite the trip data in the clear region after a substantially instantaneous voltage drop,
   wherein the program instructions that store the trip data further include:
      program instructions that calculate a checksum from the trip data,
      program instructions that store the checksum in the clear region, and
      program instructions that back up the trip data stored in the clear region and the checksum calculated therefrom into the nonvolatile region when a new checksum calculated from the generated new trip data is substantially different from the checksum stored in the clear region.

7. The non-transitory computer readable medium of claim 6, further comprising program instructions that collect the trip data to display the trip data rewritten in the clear region on a display.

8. The non-transitory computer readable medium of claim 6, further comprising computer instructions that temporarily store data during the voltage drop in the nonvolatile region disposed in the memory.

9. The non-transitory computer readable medium of claim 6, wherein the program instructions that collect the trip data further comprise:

program instructions that recalculate a checksum from the trip data backed up in the nonvolatile region in the storing of the trip data; and program instructions that compare the recalculated checksum with the checksum stored in the nonvolatile region in the storing of the trip data and collecting the trip data backed up in the nonvolatile region to rewrite the trip data in the clear region when the recalculated checksum is substantially identical to the checksum.

10. The non-transitory computer medium of claim 6, wherein the plurality of signals may be selected from a group consisting of: an engine controller signal, a transmission controller signal, an automatic brake system signal, and a vehicle speed sensor signal.

11. A system for preventing a loss of trip data of a vehicle upon a substantially instantaneous voltage drop in a vehicle cluster, the system comprising:

a processor configured to calculate trip data using a plurality of signals;

a clear region of a memory, on which a processor stores the trip data;

a nonvolatile region of the memory, on which the processor backs up the trip data stored in the clear region when new trip data is generated; and a display on which the processor displays rewritten trip data in the clear region after a substantially instantaneous voltage drop occurs, wherein the processor is further configured to:
calculate a checksum from the trip data,
store a checksum in the clear region of the memory, and
back up the trip data stored in the clear region and the checksum calculated therefrom into the nonvolatile region when a new checksum calculated from new trip data that is generated is substantially different form the checksum stored in the clear region of the memory.

12. The system of claim 11, wherein the nonvolatile region is configured to temporarily store data during the voltage drop.

13. The system of claim 11, wherein the processor is further configured to:

recalculate a checksum from the trip data backed up in the nonvolatile region in the storing of the trip data; and compare the recalculated checksum with the checksum stored in the nonvolatile region in the storing of the trip data and collect the trip data backed up in the nonvolatile region to rewrite the trip data in the clear region when the recalculated checksum is substantially identical to the checksum.

14. The system of claim 11, wherein the plurality of signals may be selected from a group consisting of: an engine controller signal, a transmission controller signal, an automatic brake system signal, and a vehicle speed sensor signal.

* * * * *